April 7, 1970

D. DÖNITZ 3,504,610

METHOD AND APPARATUS FOR AUTOMATICALLY
FOCUSSING OPTICAL DEVICES

Filed Feb. 28, 1966

United States Patent Office 3,504,610
Patented Apr. 7, 1970

3,504,610
METHOD AND APPARATUS FOR AUTOMAT-
ICALLY FOCUSSING OPTICAL DEVICES
Dieter Dönitz, Braunschweig, Germany, assignor to
Voigtlander A.G., Braunschweig, Germany, a corporation of Germany
Filed Feb. 28, 1966, Ser. No. 530,724
Claims priority, application Germany, Mar. 4, 1965,
V 27,965
Int. Cl. G03b 3/10
U.S. Cl. 95—44   17 Claims

ABSTRACT OF THE DISCLOSURE

The invention relates to cameras incorporating an objective for focusing on an object to establish an electronic effect, and incorporating that type of device in which an imaging means provides a pair of images of the object on which the objective is to be focused, these images being continuously scanned photoelectrically so as to determine the degree of contrast and to provide electrical currents corresponding to the degree of contrast. These currents are then compared and the objective is adjusted with respect to the object until variations in the currents are at a minimum.

---

The present invention relates to the automatic focusing of optical devices. Thus, the optical device will ordinarily have an objective which is to be focused on a given object.

The object on which the objective is to be focused will have a predetermined contrast, and the invention relates to that type of device in which an imaging means provides a pair of images of the object on which the objective is to be focused, these images being continuously scanned photoelectrically so as to determine the degree of contrast and to provide electrical currents corresponding to the degree of contrast. These currents are then compared and the objective is adjusted with respect to the object until variations in the currents are at a minimum.

Devices and methods which operate on the above principles are already known. For example, it is known to take part of the beam which passes through the objective of a camera and, by way of a periodically moving optical element having a surface of variable refractive power to project the image onto a predetermined control plane. At the latter plane the image is scanned at the extreme positions of the optical element where the maximum and minimum refractive powers are provided. In this way a pair of photoelectric currents can be achieved from the two images, and these currents can be compared so that their differences will serve as a criterion for adjusting the objective. In the event that both of the electrical currents are the same, then the scanned images will necessarily have the same degree of sharpness, or more precisely will lack sharpness to the same extent. The correspondingly sharp images are situated in one case before and in the other case behind the control plane at the same distance therefrom. In the control plane, whose position corresponds to that of the film in the camera, for example, the image will be sharp and the camera will be focused when the optical element is eliminated. A method and apparatus of this latter type has the disadvantage of comparing images which lack sharpness. Thus, the currents which are derived from scanning of these images are relatively flat and provide a relatively inaccurate degree of comparison. Moreover, this type of method and apparatus cannot be used for focusing an optical device on an object which has a great depth of field.

It is also known, for example, to scan an image which corresponds to that received by the optical device. The criterion in this case for sharpness of the focus is the relationship between the high and the low frequency of the current derived from the scanning of the image. With this sort of arrangement a special optimum finder is required, and this special structure interrupts the adjusting process as soon as the optimum is achieved.

It is a primary object of the invention to provide a method and apparatus of the above general type, wherein a higher degree of accuracy and a far wider range of utility can be achieved.

It is furthermore an object of the invention to provide an apparatus of this type which is considerably simpler than the conventional apparatus.

Furthermore, it is an object of the invention to provide a method and apparatus which are particularly suitable for focusing on objects where a large depth of field is required.

Also, the objects of the present invention include a device which will accentuate the contrasting points of an object, on which an objective is to be automatically focused, in such a way that a highly accurate adjustment can be achieved for any random distribution of contrast in the object.

Also, it is an object of the invention to provide a structure which is exceedingly compact so that it can be incorporated into devices of relatively small dimensions.

With the present invention the objective which is to be automatically focused is directed toward an object of a given degree of contrast. An imaging means provides from this object a pair of object images which, in accordance with the present invention, have different *f*-numbers, and these images are scanned so as to provide, as by photoelectric scanning, a pair of electrical currents whose characteristics correspond to the contrast of the images. These currents are compared and adjustments are made until the differences therebetween are at a minimum, at which point the objective which is adjusted to a position corresponding to the minimum differential between these currents, is properly focused.

As is well known, an image which is derived from an objective will have a greater degree of sharpness for a greater *f*-number. The *f*-number of course is the ratio between the focal length and the diameter of the entrance pupil of the objective. Thus, the higher the *f*-number the sharper the image. Therefore, a pair of images of the same object but of sharply different *f*-numbers will have degrees of sharpness which differ more or less considerably one from the other. When such images are scanned, as by a photoelectric structure, then there will be provided photoelectric currents wherein the amplitude and phase of one current will be different from the amplitude and phase of the other current. The image of the smaller *f*-number is in sharp focus when the difference between the curves of these electrical currents is at a minimum. If, when constructing the photoelectric scanning device and the structure for comparing the currents, the difference between the *f*-numbers is initially taken into consideration, then it is possible to cause any differences between the photoelectrically derived currents to disappear when the objective is properly focused.

Thus, with the method and apparatus of the invention the two images are scanned in their sharpest conditions, so that a far greater degree of accuracy can be achieved than with an arrangement where relatively unsharp images are scanned. The method and apparatus of the invention is therefore particularly suitable for focusing optical devices on objects having a great depth of field. In this latter case the image of the smaller *f*-number indicates at the very beginning whether there is within the space toward which the objective is directed a particular object which is to be imaged by the objective. Moreover, the image of smaller *f*-number assures that after focusing there will be the optimum depth of field, without requiring any special measurements for this purpose. In addition, as will be apparent from the description below, the method and apparatus of the invention enable the desired results to be achieved with an exceedingly simple structure through the use of images of different *f*-numbers.

The invention is illustrated by way of example in the accompanying drawings which form part of the application and in which.

Figure 1:
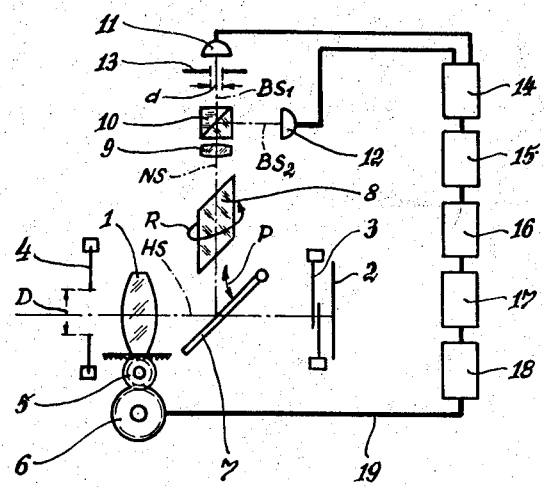
FIG. 1 is a schematic illustration of one possible embodiment of a method and apparatus of the invention.

Referring now to FIG. 1, there is illustrated therein the objective 1 of a photographic camera, this objective being the objective means which is to be focused on a given object having a given degree of contrast. The objective 1 is to provide on the film 2, in the plane in which the film 2 is situated, a sharp image of the unillustrated object. Between the objective and the film is a conventional shutter 3. In front of the objective is situated an adjustable diaphragm 4 of conventional structure which can be adjusted so as to provide apertures of different sizes. The primary beam which extends from the object through the diaphragm 4, the objective 1, and the shutter 3 so as to reach the film 2 is indicated at HS. This beam of course extends along the optical axis of the objective 1.

The objective is adjusted by way of a mechanical transmission which includes a drive 5 driven by a focusing motor 6. The motor 6 can turn a gear which in turn drives a pinion of the drive 5 which meshes with a rack of the drive 5, and this rack is fixed to the objective assembly so as to shift the latter along the optical axis. In accordance with the direction of rotation of the motor 6 the objective will be shifted forwardly or rearwardly along the optical axis.

In the illustrated example there is situated between the objective 1 and the shutter 3 a spring-operated reflector 7 capable of turning about an axis normal to the plane of FIG. 1 in the direction indicated by the double-headed arrow P. Thus, this reflector can turn away from the beam HS and back into this beam so as to have the position shown in FIG. 1. When the reflector 7 is situated in the path of the beam HS, the beam is directed by the reflector along the beam path NS. Along the beam NS is situated an imaging means which provides images of different *f*-numbers, respectively. This imaging means includes a rotary optical unit 8 which turns about the beam axis NS in the direction of the arrow R. This unit 8 is followed by a micro-objective 9 in the form of a cylinder lens. Situated behind the cylinder 9 is a beam splitter 10 which divides the beam NS into a pair of image beams BS$_1$ and BS$_2$. A pair of scanning means respectively receive the image beams BS$_1$ and BS$_2$, and in the illustrated example this pair of scanning means includes the pair of photoelectric cells 11 and 12, respectively. The image at the plane of the film 2 corresponds to the image received by the objective 9.

Situated in front of the photoelectric cell 11 is a reference diaphragm 13 having an aperture *d* of constant size. Preferably this reference diaphragm 13 is in the form of an opaque plate having a relatively narrow slit which forms the aperture. As a result of this construction the photocell 11 will receive a stronger, brighter image which is highly desirable for control purposes. Precautions are taken so as to make sure that the smallest apertures D of the adjustable diaphragm 4 of the camera is at all times considerably greater than the aperture *d*.

The pair of photocells 11, 12 are connected with an electrical means which compares the photoelectric currents which will of course have characteritics matching the contrasts of the images scanned by the photocells, respectively. This electrical means in turn actuates the mechanical transmission 5, 6 which is operated automatically in response to actuation of the electrical means so as to focus the objective 1. The electrical means includes the unit 14 which measures the difference between the currents and which is electrically connected with an amplifier 15 the output of which is connected with an operator 16 which in turn has its output connected to a rectifier 17. The rectifier 17 actuates a relay 18 which through the electrical connection 19 operates the focusing motor 6.

The structure described above and shown in FIG. 1 operates in the following manner:

Assuming that the objective 1 is directed toward an object having a given, random distribution of light and dark areas, so that it has any random degree of contrast, then the spring-operated reflector 7 is initially actuated so as to be turned down to the position shown in FIG. 1 where it interrupts the travel of the light to the shutter 3 and the film 2. Therefore, the light is deflected by the reflector 7 so as to reach the beam splitter 10 which directs the pair of images to the pair of photocells 11 and 12.

The cylinder lens 9 provides the images with a striated structure. The rotary optical unit 8, which can take the form of a rotating plate having opposed flat, parallel end surfaces of a constant angle of incidence or which may take the form of a rotary reversing prism, moves the images relative to the photocells 11 and 12 in a direction transverse to the focal line of the cylinder lens 9. The image which is received by the photocell 12 has the smaller *f*-number, derived by way of the entrance pupil of the camera diaphragm 4. On the other hand, the image received by the photocell 11 has a larger *f*-number, achieved by way of the relatively small aperture pupil of the reference diaphragm 13. The focal length of both images is the same, inasmuch as the optical distance between the objective 1 and the pair of photocells is the same.

Thus, the movable unit 8 moves the images relative to the photocells 11 and 12 in a direction transverse to the focal line of the cylinder lens 9. In this way the images are scaned point-by-point. The areas of the scanned points are determined by the area limits of the photocells and the focal length of the cylinder lens 9. By the above-described and illustrated arrangement of the photocells and the remaining components of the device, simultaneous scanning at the photocells of image points which correspond to one and the same point of the object is assured.

Because of the contrast in the images the photocells will provide alternating currents. The sharper the scanned image the closer the match between the amplitude and phase of one current with the amplitude and phase of the other current. As long as the objective 1 is not in focus, the image received by the photocell 12 will remain unsharp in comparison with the image received by the photocell 11, since the image received by the photocell 12 has an *f*-number smaller than the much larger *f*-number of the image at the photocell 11.

The pair of alternating currents derived from the photocells 11 and 12 are compared in the differentiating unit 14. This differentiating unit transmits to the amplifier 15 a signal corresponding to the difference between the alternating currents, and this latter signal, thus amplified, is further transmitted to the operator 16 which serves to increase the sensitivity of the electrical assembly. The signal is rectified in the rectifier 17 and actuates the relay 18 which in turn controls the focusing motor 6 so that it will actuate the transmission 5 for adjusting the objective 1.

The structure is designed in such a way that the motor 6 will remain energized as long as the difference between the photoelectric currents of the photocells 11 and 12 has not reached a predetermined minimum, or is not zero. A complete disappearance of the difference between the photo electric currents when images of equal sharpness are received by the pair of photocells 11 and 12 can be achieved if the difference in brightness which is always present as a result of the different sizes of the apertures is compensated for by electrical structure such as, for example, a suitable resistance situated in the electrical circiut in advance of the differentiating unit 14. Also, it is possible to compensate for this difference in brightness which in any event is always present as a result of the different aperture sizes by way of a suitable optical structure.

The motor 6 can take the form of a reversible motor which causes the objective to be moved in one or the other of a pair of opposed directions. It is possible, however, to provide an electric motor which will respond to a positive or negative difference between the photoelectric circuits so as to move the objective 1 in a predetermined direction from a predetermined initial position in a manner increasing the sharpness of the image received by the photocell 12.

As soon as the images of the photocells 11 and 12 have the same degree of sharpness, the objective 1 is properly focused. At this time the spring-operated reflector 17 will be turned upwardly from its position between the objective 1 and the shutter 3, so that the shutter 3 can now be actuated to provide a sharp image at the film 2.

All of the above operations can take place automatically when the operator seeks to actuate the shutter 3, the parts being so designed that the reflector 7 does not move out of the path between the objective 1 and the shutter 3 and the shutter 3 is not opened until the above focusing operations have been completed. Structures where an element such as the reflector 7 moves out of the path of light from the objective to the film plane are well known in the reflex cameras, for example. The operator can manually actuate the structure so that first the structure 7 will move away from the beam HS and then the shutter 3 will be actuated, after a predetermined period of time sufficient for automatic focusing has elapsed, or any suitable signal can be given to permit the operator to know that the objective is focused. For example, when the focusing operations are completed the electrical circuit can automatically energize a suitable bulb which when illuminated will give to the operator a signal that an exposure can be made.

Figure 2:
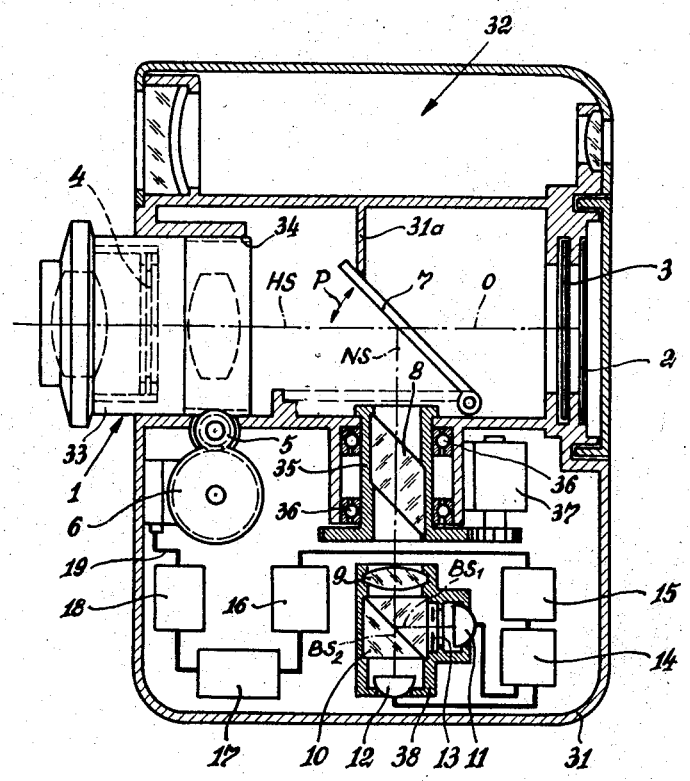
FIG. 2 is a partly schematic sectional illustration of a camera provided with the structure of FIG. 1.

FIG. 2 shows a camera, such as a television or photographic camera, which includes the structure of FIG. 1. The parts of FIG. 2 which correspond to FIG. 1 are indicated with the same reference characters and are not further described.

The camera includes a housing 31 provided with a viewfinder assembly 32. Beneath the viewfinder assembly 32 is situated the optical axis O of the camera, and along this optical axis is situated the objective which includes the lens-accommodating barrel 33 in which the lenses of the objective are situated. The objective can have a plurality of lenses, such as, for example, two lenses. The film 2 is situated in the image plane so as to be properly in position for receiving an image from the focused objective. Moreover, the objective assembly 1 includes within the barrel 33, thereof the diaphragm 4, and the shutter 3 may be a between-the-lens shutter also situated in the lens barrel 33 or it may be a focal plane shutter as shown diagrammatically in FIG. 2.

In the solid line position of the reflector 7, illustrated in FIG. 2, this reflector 7 cooperates with the interior camera housing wall 31a so as to prevent light from reaching the film 2, and therefore in this position, when the shutter 3 is a between-the-lens shutter, it can be fully opened for the purpose of focusing the objective without exposing the film. Then when the exposure is to be made the reflector 7 is turned in a well known manner to the dotted line position shown in FIG. 2, and of course in the case of a between-the-lens shutter this shutter is initially closed and then open so as to make the exposure. With a focal plane shutter as shown in FIG. 2 the shutter remains closed during focusing of the objective and is opened after the reflector 7 turns to the dotted line position so as to expose the film in a well known manner.

In order to adjust the position of the objective, the focusing motor 6 is accommodated within the camera housing and rotates a worm 5 cooperating with a worm wheel 34 which surrounds and is threaded onto the lens barrel 33 so that in response to rotary movement of the worm wheel 34, which is prevented for moving axially, the objective 33, which can move axially but cannot rotate, is focused by being shifted along the optical axis.

The rotary optical unit 8 is shown as a plano-parallel plate having the opposed parallel flat end faces situated at the inclinations illustrated. This unit is accommodated within a tubular support 35 which is supported for rotary movement about its axis by the ball bearings 36 and which is driven by a suitable drive from a motor 37.

The cylinder lens 9, the beam splitter 10, the reference diaphragm 13 and the pair of photocells 11 and 12 are carried by a common housing 38 situated in the interior of the camera housing 31.

As is apparent from FIG. 2, all parts of the apparatus of the invention can be accommodated within a relatively small space in the camera housing 31.

Figure 3:
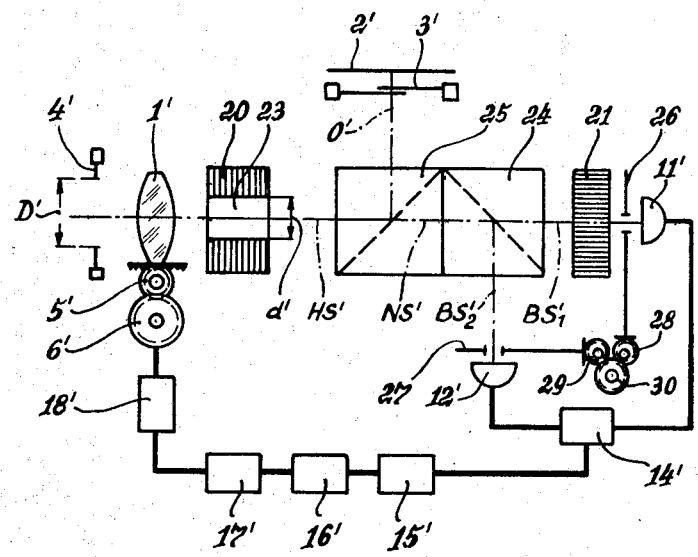
FIG. 3 is a schematic representation of another embodiment of a method and apparatus of the present invention.

FIG. 3 illustrates an embodiment of the invention which differs from that of FIGS. 1 and 2. With the method and apparatus of FIG. 3, those parts which correspond to the embodiment of FIGS. 1 and 2 are indicated with the same reference characters primed. The embodiment of FIG. 3 differs from that of FIG. 1 in that the image of higher f-number which is provided on the photocell 11' is achieved by way of a polarizing filter 20 which cooperates with a polarizing analyzer 21. The polarizing filter 20 is provided at its central portion with a clear, transparent plate 23. The diameter $d'$ of the plate 23 corresponds to the aperture $d$ of the reference diaphragm 13 of FIG. 1. The polarizing analyzer 21 is angularly displaced by 90° with respect to the polarizing filter 20, 23 and only permits the bundle of light which passes through the opening $d'$ to be transmitted to the photocell 11'. As a result the photocell 11' can only receive light which has passed through the small plate 23.

The imaging means which is situated in advance of the polarizing analyzer 21 includes the optical beam splitter 24 which reflects half of the total light passing through the polarizing filter 20 along the beam path $BS'_2$ to the photocell 12'. Therefore, the f-number of the image received by the photocell 12' is determined exclusively by the aperture $D'$ of the diaphragm 4' situated in front of the objective 1'.

Instead of a spring-actuated reflector 7, as is used in the device of FIG. 1, the embodiment of FIG. 3 is provided in front of the beam splitter 24 with a further optical beam splitter 25 which directs the primary beam HS' to the shutter 3' through which the beam passes along the optical axis O' to reach the film 2'.

In the embodiment of FIGS. 1 and 2 the rotary unit 8 provided the scanning movement. The scanning movement is achieved with the embodiment of FIG. 3 by situating in front of the photocells 11' and 12' the opaque plates 26 and 27 formed with elongated slits through which the light reaches the photocells. These plates are guided in any suitable way for movement so that their slits can pass back and forth across the front of the photocells. In order to move the plates rotary cams 28 and 29 are provided, and any suitable spring structure maintains the plates in engagement with the cams. A scanning motor 30 is common to the rotary cams and drives them synchronously so that the slits of the plates 26 and 27 pass uniformly across the photocells in synchronism. Thus, the slits or gaps of the plates 26 and 27 move synchronously and in the same directions in front of the photocells 11' and 12', so that in this way it will always be the very same portions of the pair of images which are simultaneously scanned.

The embodiment of FIG. 3 corresponds in its operation with that of FIG. 1. The only differences reside in the replacement of the reference diaphragm 13 with the cooperation between the polarizing filter 20, 23 and the polarizing analyzer 21, the replacing of the rotary unit 8 with the movable slotted plates 26, 27, and the replacing of the spring-actuated reflector 7 with the optical beam splitter 25. A special, more detailed description of the operation of the device of FIG. 3 is therefore unnecessary.

Of course, the invention is not limited to the specific details shown in the drawing and described above. The method of the invention can of course be applied to optical devices other than cameras. It is suitable preferably for optical devices which are to be sharply focused on objects having an unknown depth of field. At the same time, however, the method and apparatus of the invention is equally applicable for the sharp focusing of an objective on an object situated in a plane. The customary uses for devices of the above type are encountered in photographic still or motion picture cameras and photographic still or motion picture projectors.

In both of the embodiments of the invention described above the pair of images which are scanned are simultaneously provided. It is, however, possible to provide images which are achieved sequentially one after the other, and this result can be achieved by periodically introducing into the image beam a reference diaphragm or equivalent optical element. Thus, at those intervals when the reference diaphragm is in the beam of light an image of relatively high $f$-number will be achieved while at the intervening intervals when the reference diaphragm is not in the light path an image of lower $f$-number will be achieved. A single photosensitive device can then scan the sequentially produced images so that these images are scanned once during an interval when the reference diaphragm is present and once during an interval when the reference diaphragm is not present. This will result in a pair of alternating currents having a phase shift which can be compensated by a known phase shifting structure. With such a construction there will be situated between the photoelectric element and the differentiating unit a switching arrangement which directs the currents derived from the sequential images along different circuits or conductors. Such a method and apparatus can provide an exceedingly simple structure. It is suitable, however, only for devices which do not move during adjustment of the objective with respect to the object on which the objective is to be focused.

While with the method and apparatus described above the pair of images of different $f$-numbers are derived from the very same light beam which passes through the objective which is to be focused, it is also possible to provide a separate focusing objective different from the objective of the optical device which is to be adjusted and coupled thereto so that the adjusting movements are transmitted in this way to the objective of the device which is to be focused. Moreover, it is possible to provide an intermediate solution where the image with the larger $f$-number is derived from a special objective while the image with the smaller $f$-number is derived directly from the objective which is to be focused. Also in this case both of the objectives must be coupled to each other for movement together.

In order to scan the images it is also possible to move the photosensitive elements themselves in synchronism. Moreover, the scanning can take place electronically in such a way that the photoelectric element takes the form of the picture tube on a television camera.

In general, the photosensitive scanning structure need not be a photocell but instead can take the form of a transistor, a diode, a barrier layer element, a photo conductor, a vacuum cell, or the like.

Instead of a spring-actuated reflector 7, it is also possible to use a stationary semi-transparent reflector. In this way it is possible to eliminate the spring mechanism.

The cylinder lens 9 can also take the form of an auxiliary objective having a plurality of lenses situated at the same location as the cylinder lens 9.

Moreover, the method of the invention is not of utility only in the case where images of visible light are used. It can also be used equally well with any electromagnetic beams.

The different $f$-numbers for the two images need not be provided solely by way of apertures of different sizes. Different $f$-numbers can also be achieved by providing different focal lengths for the pair of images.

Moreover, the accuracy of the adjustment can be increased by increasing the difference between the $f$-numbers. For the purposes of the adjustment, therefore, the diaphragm 4, or 4' in the case of FIG. 3, should always have its largest opening which can be provided by way of a spring-operated diaphragm.

Naturally, the above-described details can be used in combinations different from those described above and shown in the drawing.

It is to be noted that an arrangement as described above where a pair of sequential images are received by the same photosensitive unit will result not only in simplifying the structure but also in a considerable saving of space, so that where space is at a premium an arrangement of this type may be used in accordance with the invention.

Furthermore, the use of a stationary opaque plate having a slit therein to provide the reference diaphragm 13 greatly contributes to the simplicity and compactness of the structure.

While it has been mentioned above that it is possible to use an additional objective for the purpose of achieving at least one of the images, the described and illustrated structure where the very same objective is used for adjustment purposes as well as for making the final exposure is preferred because of the simplicity in using a single objective both for adjustment purposes and for the purpose of being adjusted.

By situating the unit 8 of FIG. 1 in advance of the beam splitter, absolute synchronism in the movement of the images and thus in the scanning thereof is guaranteed, so that in this connection the structure of FIG. 1 is preferable to that of FIG. 3 where synchronism must be achieved by way of precise equality in the cams 28 and 29. Of course, with the arrangement of FIG. 3 the gaps of the shiftable scanning plates 26 and 27 provide a neat, sharply defined field of the image which is scanned at any given instant, and this same limiting of the scanned image field is achieved in FIG. 1 by the dimensions of the photocells 11 and 12 themselves.

The present invention relies, in the same way as known methods and apparatus of the same type, on the fact that the photoelectric scanning of an image will provide a change in the electrical current at the boundary between light and dark areas of the image. The extent to which the current changes under these conditions is more pronounced the more sharply defined the boundary between the light and dark areas. The method and apparatus of the invention thus recognizes that in any object on which the objective is to be focused there will be a random but definite distribution of light and dark areas. It is highly desirable to have the boundaries between the light and dark areas of the image extend transversely with respect to the direction in which the image is scanned, since the change in the photoelectric current when the boundary between a light and dark area of the image is scanned will be much more sharply pronounced the closer the angular relationship between the scanning direction and boundary between the light and dark areas is 90°. In any given object there will be a random distribution of light and dark areas, and the boundaries therebetween will extend, by chance, transversely to the scanning direction only to an extent which can be statistically determined. Of course, the extent to which these boundaries do not extend transversely with respect to the scanning direction reduces the accuracy with which the contrast of the image can be sensed.

A great improvement in the situation is provided with the present invention by the presence of the cylinder lens 9 in the path of the beam from which the pair of scanned images are derived. As has been pointed out above this cylinder lens has a focal line which extends transversely to the scanning direction. Thus, the cylinder lens 9 provides non-stigmatic images having a striated structure in which the elongated strip-portions of the image extend transversely to the scanning direction. A cylinder lens has the characteristic of emphasizing the boundaries, between light and dark areas, which extend in the direction of its focal line, whereas those boundaries, between light and dark areas, or contrast lines, which extend transversely to the focal line of the cylinder lens are brought more or less to a disappearing point. Therefore, the cylinder lens provides for any given image having a random distribution of light and dark areas the characteristics of an image wherein the boundaries between the light and dark areas all extend in one direction, without, however, changing the number and sharpness of boundaries or contrast lines between the light and dark areas of the image. When the image thus derived by way of the cylinder lens is scanned transversely to the focal line thereof, there will be a large number of sharp contrast changes and therefore a correspondingly very sharply defined photoelectric current which makes an extremely accurate comparison of the two electrical currents possible.

As has already been indicated above, various features of the invention can be used separately and are not of utility only in the particular combination described above and shown in the drawings. This feature of the cylinder lens is one of the parts of the invention which is of separate utility apart from the disclosed combination of features. In any case where an image is to be scanned so as to achieve a photoelectric current whose variations will depend upon the degree of contrast detected in the image, the cylinder lens will provide the above-discussed advantages, so that its use for this purpose per se, apart from the entire organization is of considerable advantage.

What is claimed is:

1. A method of focusing the objective of an optical device on an object of given contrast, comprising the steps of providing from light which passes through said objective two object-images of different $f$-numbers, respectively, converting the contrasts of said images into corresponding electrical currents, comparing said currents, and adjusting the position of the objective to one corresponding to a position at which the difference between said currents is a predetermined minimum.

2. A method of focusing the objective of an optical device on an object of given contrast, comprising the steps of providing two object-images of different $f$-numbers, respectively, converting the contrasts of said images into corresponding electrical currents, comparing said currents, and adjusting the position of the objective to one corresponding to a position at which the difference between said currents is a predetermined minimum, said object images being derived with equal focal lengths but through diaphragm apertures of different sizes.

3. A method as recited in claim 1 and wherein said object images are simultaneously provided and are separately scanned by separate photoelectric devices to achieve said electrical currents.

4. In an optical assembly, adjustable objective means for providing an image of an object of given contrast, said adjustable objective means being adjustable to provide a sharp image of said object when said objective means is properly focused on the object, imaging means imaging from light which passes through said objective means itself the object with a pair of distinct images of different $f$-numbers, photosensitive scanning means scanning said images to provide a pair of electrical currents having characteristics corresponding to the contrasts of said images of different $f$-numbers, electrical means operatively connected with said scanning means for comparing said electrical currents, and mechanical transmission means automatically actuated by said electrical means and operatively connected to said objective means for automatically adjusting the latter and simultaneously altering the images produced by said imaging means until the differences between said electrical currents are at a predetermined minimum, so that when the latter condition is reached said objective means will be focused on the object.

5. The combination of claim 4 and wherein said imaging means includes structures providing apertures of different sizes through which said images are given their different $f$-numbers, respectively.

6. The combination of claim 5 and wherein a reference diaphragm having a relatively small constant aperture provides the larger $f$-number for said imaging means while a diaphragm whose smallest aperture is larger than the constant aperture of said reference diaphragm forms that part of said imaging means which participates in producing the image of smaller $f$-number.

7. In an optical assembly, adjustable objective means for providing an image of an object of given contrast, said adjustable objective means being adjustable to provide a sharp image of said object when said objective means is properly focused on the object, imaging means imaging the object with a pair of distinct images of different $f$-numbers, photosensitive scanning means scanning said images to provide a pair of electrical currents having characteristics corresponding to the contrasts of said images of different $f$-numbers, electrical means operatively connected with said scanning means for comparing said electrical currents, said mechanical transmission means automatically actuated by said electrical means and operatively connected to said objective means for automatically adjusting the latter and simultaneously altering the images produced by said imaging means until the differences between said electrical currents are at a predetermined minimum, so that when the latter condition is reached said objective means will be focused on the object, said imaging means providing said images from a common beam, said imaging means including a first polarizing unit for producing the image of smaller $f$-number and a second polarizing unit which polarizes only part of the beam polarized by said first unit for producing the image having the larger $f$-number.

8. In an optical assembly, adjustable objective means for providing an image of an object of given contrast, said adjustable objective means being adjustable to provide a sharp image of said object when said objective means is properly focused on the object, imaging means imaging the object with a pair of distinct images of different $f$-numbers, photosensitive scanning means scanning said images to provide a pair of electrical currents having characteristics corresponding to the contrasts of said images of different $f$-numbers, electrical means operatively connected with said scanning means for comparing said electrical currents, and mechanical transmission means automatically actuated by said electrical means and operatively connected to said objective means for automatically adjusting the latter and simultaneously altering the images produced by said imaging means until the differences between said electrical currents are at a predetermined minimum, so that when the latter condition is reached said objective means will be focused on the object, said imaging means providing said images from a common beam and including a beam splitter which divides said common beam into a pair of beams which participate in producing said images, said photosensitive scanning means including a pair of photoelectric cells situated in the paths of said pair of beams into which said common beam is divided by said beam splitter, and aperture means situated between one of said photoelectric cells and said beam splitter for producing the image of higher f-number at said one photoelectric cell.

9. The combination of claim 4 and wherein said imaging means includes a beam splitter for splitting light which passes through said objective means into a pair of beams from which said images are respectively derived.

10. The combination of claim 4 and wherein said imaging means includes an image-moving unit which moves the images with respect to said scanning means.

11. The combination of claim 4 and wherein said photosensitive scanning means includes a pair of photoelectric cells, a pair of scanners situated in front of said cells, and a pair of shifting units operatively connected with said scanners for shifting the latter across said cells, respectively.

12. The combination of claim 4 and wherein said photosensitive scanning means includes a television camera.

13. The combination of claim 4 and wherein said photosensitive scanning means limits the fields of said images which are scanned.

14. The combination of claim 4 and wherein said imaging means includes a reference diaphragm having an aperture in the form of a slit for producing the image of higher f-number.

15. In an optical assembly, adjustable objective means for providing an image of an object of given contrast, said adjustable objective means being adjustable to provide a sharp image of said object when said objective means is properly focused on the object, imaging means imaging the object with a pair of distinct images of different f-numbers, photosensitive scanning means scanning said images to provide a pair of electrical currents having characteristics corresponding to the contrasts of said images of different f-numbers, electrical means operatively connected with said scanning means for comparing said electrical currents, and mechanical transmission means automatically actuated by said electrical means and operatively connected to said objective means for automatically adjusting the latter and simultaneously altering the images produced by said imaging means until the differences between said electrical currents are at a predetermined minimum, so that when the latter condition is reached said objective means will be focused on the object, and scanning means for scanning an image in a given direction, and imaging means for directing to said scanning means an image to be scanned thereby, said imaging means including a cylinder lens having a focal line extending transversely with respect to said scanning direction to provide at the scanning means a non-stigmatic image of striated structure extending transversely with respect to the scanning direction.

16. The combination of claim 15 and wherein said scanning means moves said cylinder lens periodically to achieve the scanning movement.

17. In an optical assembly, adjustable objective means for providing an image of an object of given contrast, said adjustable objective means being adjustable to provide a sharp image of said object when said objective means is properly focused on the object, imaging means imaging the object with a pair of distinct images of different f-numbers, photosensitive scanning means scanning said images to provide a pair of electrical currents having characteristics corresponding to the contrasts of said images of different f-numbers, electrical means operatively connected with said scanning means for comparing said electrical currents, and mechanical transmission means automatically actuated by said electrical means and operatively connected to said objective means for automatically adjusting the latter and simultaneously altering the images produced by said imaging means until the differences between said electrical currents are at a predetermined minimum, so that when the latter condition is reached said objective means will be focused on the object, said imaging means including a rotary optical unit which moves the images with respect to said scanning means.

References Cited

UNITED STATES PATENTS

| 2,134,757 | 11/1938 | Goldsmith | 95—45 X |
| 2,339,780 | 1/1944 | Huitt | 352—140 |
| 2,524,807 | 10/1950 | Kallmann | 95—44 X |
| 2,968,994 | 1/1961 | Shurcliff | 88—56 X |
| 3,185,059 | 5/1965 | Durst | 95—44 |
| 3,274,913 | 9/1966 | Biedermann et al. | 95—44 |
| 3,336,851 | 8/1967 | Warshawsky | 95—44 |

FOREIGN PATENTS

| 735,743 | 8/1955 | Great Britain. |
| 735,747 | 8/1955 | Great Britain. |
| 1,210,672 | 2/1966 | Germany. |
| 1,231,445 | 12/1966 | Germany. |

RONALD L. WIBERT, Primary Examiner

T. MAJOR, Assistant Examiner

U.S. Cl. X.R.

250—204